United States Patent

Shivvers

[15] 3,682,394
[45] Aug. 8, 1972

[54] MATERIAL SPREADER ASSEMBLY
[72] Inventor: Charles C. Shivvers, 614 West English, Corydon, Iowa 50060
[22] Filed: Feb. 3, 1971
[21] Appl. No.: 112,375

[52] U.S. Cl. ............... 239/665, 214/17 CB, 239/687
[51] Int. Cl. ............................................. B65g 65/32
[58] Field of Search ..... 214/17 CB; 302/60; 198/128; 239/665, 687

[56] References Cited

UNITED STATES PATENTS 3,282,591  11/1966  Donelson............214/17 CB X
3,488,007  1/1970  Neuenschwander.........214/17 CB X Primary Examiner—Robert G. Sheridan
Attorney—Rudolph L. Lowell

[57] ABSTRACT

The spreader assembly is located within a top fill opening or material inlet of a bin for evenly distributing a material such as grain over the floor area of the bin. The material is directed downwardly of the assembly onto a rotatable spreader pan which is tiltably adjustable about a horizontal axis to uniformly spread materials of varying density. Adjustment of the spreader pan is accomplished by means conveniently located for unobstructed access directly at the top fill opening.

5 Claims, 5 Drawing Figures

PATENTED AUG 8 1972 3,682,394
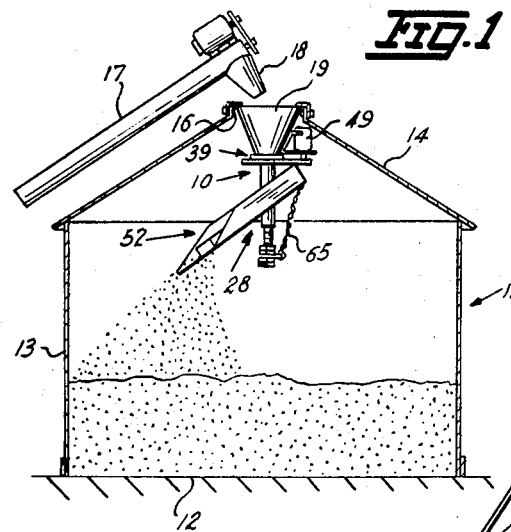
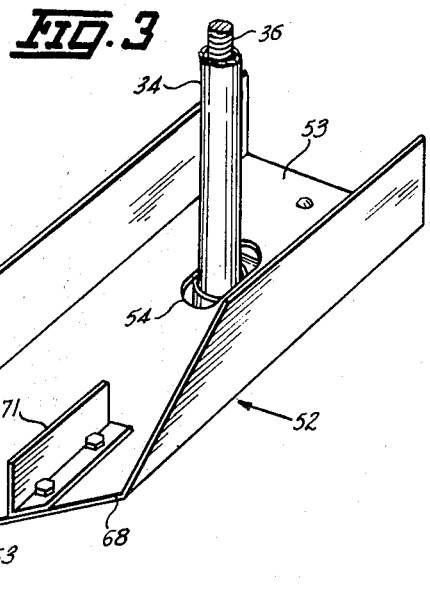
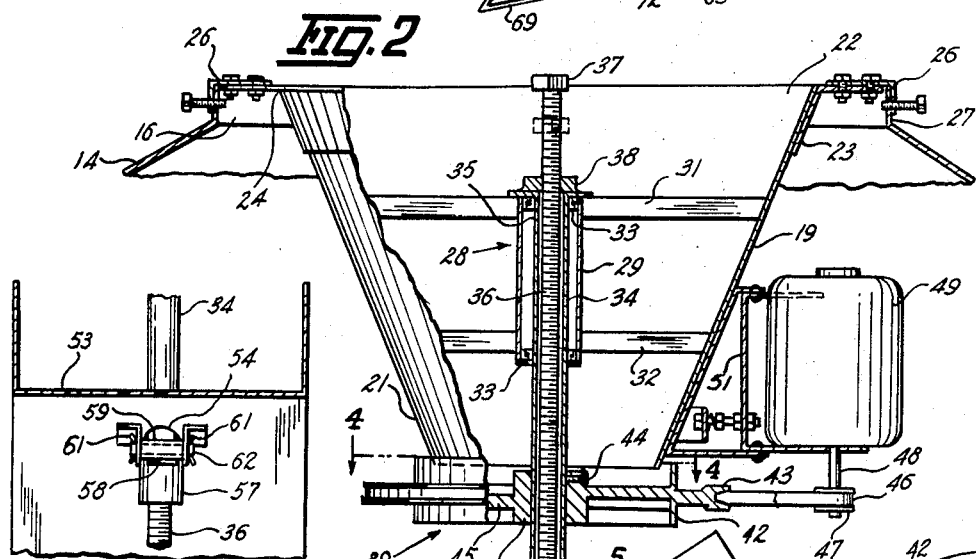
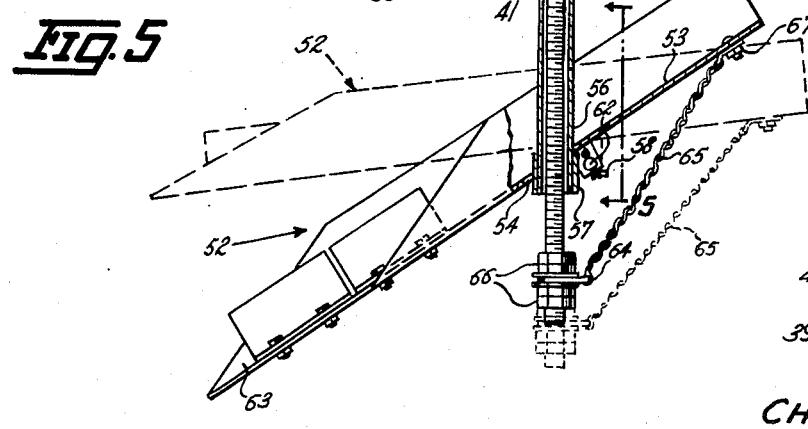
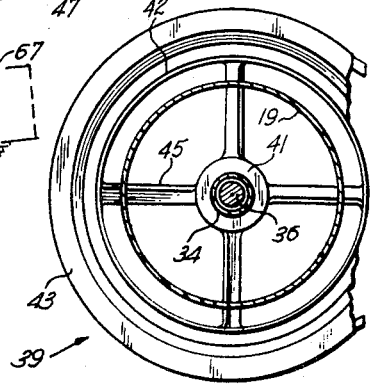
INVENTOR.
CHARLES C. SHIVVERS
BY Rudolph L. Lowell
ATTORNEY.

3,682,394

MATERIAL SPREADER ASSEMBLY

SUMMARY OF THE INVENTION

The spreader assembly is of compact construction and efficient in operation to uniformly distribute grain over the horizontal floor area of a storage bin. The spreader pan is rotatably supported and tiltably adjustable to provide a desired distribution pattern for different density materials. The material being handled has a substantially free fall through the spreader assembly and onto the spreader pan, and the adjusting mechanism for tilting the pan is readily accessible at the fill opening in the top of the bin.

BRIEF DESCRIPTION OF THE DRAWINGS

FIG. 1 is a diagrammatic illustration of a bin showing the material spreader of this invention in assembly relation therewith;

FIG. 2 is an enlarged side elevational view of the material spreader with parts broken away and other parts shown in section to more clearly illustrate the construction thereof;

FIG. 3 is a detail top perspective view of the spreader pan; and

FIG. 4 and 5 are enlarged sectional detail views taken along the lines 4 — 4 and 5 — 5, respectively, in FIG. 2.

DETAIL DESCRIPTION OF THE INVENTION

With reference to the drawing the material spreader of this invention, indicated generally as 10 in FIG. 1, is shown in assembly relation with a bin 11 of cylindrical shape having a floor area 12 defined by a side wall 13. A conical roof 14 for the bin 11 has a central circular fill opening or material inlet 16. Material, such as grain may be supplied to the inlet 16 by an auger type feed conveyor 17 having an outlet 18 arranged for discharge of material directly into the inlet 16.

The material spreader 10 (FIGS. 1 and 2) includes a circular chute member 19 of a funnel shape having a lower discharge end 21 and an upper end 22 located within the fill opening 16. A ring shape bracket 23 mounted about the upper end 22 of the chute member 19 terminates in a radially extended angular flange 24 carrying adjustable brackets 26 by means of which the chute 19 is supported on a vertically extended circular wall 27 that defines the inlet opening 16.

Extended axially of the chute 19 (FIG. 2) and projected downwardly from its discharge end 21 is a linearly adjustable mechanism 28 that has a tubular housing 29 with radially extended upper and lower supporting arms 31 and 32 having outer ends secured to the inner peripheral surface of the chute 19. Rotatably supported within the tubular housing 29, as the bearings 33, is an elongated tubular casing member 34, the upper end of which is substantially at the level of the upper end of the tubular housing 29. Axially positioned within the elongated tubular casing 34 and projected outwardly from the opposite ends thereof is a screw member 36 formed with an upper head portion 37. The screw 36 is threadably engaged with a nut assembly 38 that is secured to the upper end 35 of the elongated casing 34 in a covering relation with the upper end of the tubular housing 29.

As best appears in FIG. 2, the nut assembly 38 and head portion 37 are directly accessible at the upper end of the chute member 19 at the fill opening 16. Adjustment of the screw 36 axially of the elongated casing 34, for a purpose to appear later, is thus readily accomplished by merely holding the nut assembly 38 against rotation and then rotating the screw 36 relative thereto whereby the screw is adjusted axially of the tubular casing 34.

For rotating the casing 34 and screw 36 as a unit, a combination wheel and pulley unit 39 is mounted on the casing below and adjacent to the lower end 21 of the chute 19. This combination unit 39 (FIGS. 2 and 4) includes a hub section 41, an intermediate upright rim section 42, and an outer pulley section 43 of a flat ring shape. The hub 41 is fixed on the tubular casing 34 by a friction screw 44 and is connected to the rim section 42 by a plurality of inclined or propeller type spokes 45. The pulley section 43 is connected by a V-belt 46 with a drive pulley 47 carried on the shaft 48 of a vertically positioned electric motor 49. The motor 49 is mounted on an adjustable bracket 51 that is secured to the outside of the chute 19 adjacent its discharge end 21.

Pivotally supported on the tubular casing 34 at a position below the combination unit 39 is a material distributing or spreader pan 52 of a channel shape. Formed in the base wall 53 (FIGS. 2 and 3) of the spreader pan and off-set from the longitudinal center of the pan is a longitudinally extended opening 54 for receiving therethrough the lower end 56 of the tubular casing 34. A cylindrical sleeve 57 mounted about the lower end 56 of the casing 34 is provided with a horizontal shelf 58 on which is carried a horizontal tubular bearing member 59. The pan base wall 53 (FIGS. 2 and 5), adjacent one end of the opening 54, carries a pair of transversely spaced depending ears 61 for receiving therebetween the bearing member 59. A pivot pin 62 projected through openings (not shown) in the ears 61 and through the bearing member 59 pivotally connects the pan 52 for up and down pivotal movement relative to the adjusting mechanism 28.

As a result of the off set location of the opening 54 longitudinally of the pan 52, the pan is normally inclined downwardly in one direction by the action of gravity so that the material distributing end 63 thereof is lowermost (FIG. 2). Since the material dropping onto the rotating pan 52 has a pattern spread dependent upon the tilt of the pan 52 and the density of the material being handled, provision is made for adjusting the pan tilt in conformance with the material density.

Fot this purpose one end 64 of a link, illustrated as a chain 65, is attached to the lower end of the screw 36 between a pair of lock nut assemblies 66. The opposite end 67 of the chain 65 is secured to the underside of the base wall 53 at the end thereof opposite its lower or distributing end 63. On axial or linear adjustment of the screw 36 relative to the tubular casing 34, the chain end 64 is vertically moved relative to the pan pivot 62. When the chain end 64 is moved toward the pivot 62 the angular tilt of the pan 52 is increased as illustrated in full lines in FIG. 2. On movement of the chain end 64 away from the pivot 62 the angular tilt of the pan 52 is decreased as shown in dotted lines in FIG. 2.

The distributing end 63 of the rotatable pan 52 is inclined transversely of the pan to form a leading end 68 located radially inwardly of a trailing end 69. In use the pan 52 is rotated in the direction of the leading end 68 concurrently with the supply of the material from the auger 17 into the upper end 22 of the chute member 19. By virtue of the vertical disposition of the adjustable mechanism 28 axially of the chute member 19 and the propeller shape of the spokes 45 in the combination wheel and pulley unit 39, material is permitted to drop freely through the chute member and onto the pan 52. The material on the pan gravitates downwardly toward its distributing end 63 from where it is thrown outwardly by the action of centrifugal force. Deflecting or guide vanes 71 at the distributing end 63 act to spread the material transversely of the pan 52 for discharge over the length of the inclined edge 72 to provide for a uniform spreading thereof over the bin floor area 12, as illustrated in FIG. 1.

By virtue of the downward feeding action of the spokes 45 and the arrangement of the chain 65 and the pan support means to the underside of the pan, the material from the feed auger 17 has a substantially unobstructed free fall through the chute 19 and onto the distributor pan 52. Also as previously mentioned, tilting adjustment of the pan 52 is accomplished directly at the fill opening 16 where the nut assembly 38 and screw head portion 37 are directly available for relative manipulation. As a result it is not necessary for the bin operator entering the bin 11 for the purpose of making this adjustment so that adjustments can be made, if necessary during a bin filling operation.

Although the invention has been specifically described with respect to a preferred embodiment thereof, it is to be understood that it is not to be so limited since changes and modifications can be made therein which are within the full intended scope of this invention as defined by the appended claims.

I claim:

1. In a spreader assembly:
  a. an upright tubular chute member having an upper inlet end and a lower discharge end;
  b. an elongated adjustable unit including a longitudinally adjustable member,
  c. means rotatably supporting said unit in a vertical position axially of and within said chute member and projected downwardly from said lower discharge end,
  d. motor means mounted on and exteriorly of said chute member,
  e. means connecting said adjustable unit for rotation by said motor means,
  f. a distributing member of a channel shape positioned below said lower discharge end having a base wall formed with a longitudinally extended slot for receiving said adjustable unit,
  g. means pivotally supporting said distributing member on said adjustable unit for tilting movement longitudinally thereof, and
  h. means providing for pivotal movement of said distributing member to a selected tilted position in response to the adjustment of said adjustable member.

2. In a spreader assembly:
  a. an upright tubular member having an upper inlet end and a lower discharge end,
  b. an adjustable unit including an outer elongated member and an inner member projected longitudinally through said outer member,
  c. means supporting said inner member on the outer member for adjustable movement longitudinally thereof,
  d. means rotatably supporting said adjustable unit in a vertical position axially of and within said chute member and projected downwardly from said lower discharge end,
  e. motor means mounted on and exteriorly of said chute member,
  f. means connecting said adjustable unit for rotation by said motor means,
  g. a spreader member of a channel shape located below and extended transversely of said lower discharge end having a base wall formed with a longitudinally extended slot for receiving said adjustable unit,
  h. means pivotally supporting said spreader member adjacent said slot therein on said outer member for pivotal movement longitudinally of said adjustable unit, and i. link means extended between and connected to said base wall and to the lower end of said inner member whereby said spreader member is pivotally movable in response to the adjustment of said inner member longitudinally of said outer member.

3. The spreader assembly according to claim 2 wherein:
  a. said outer member comprises an elongated tubular casing and said inner member a screw member, and
  b. a nut member secured to the upper end of said outer member in axial alignment therewith for threadable engagement with said inner member, whereby said spreader member is pivotally movable in response to a relative rotation between said inner member and said nut member.

4. The spreader assembly according to claim 2 wherein:
  a. said motor means has a vertically disposed drive shaft,
  b. a wheel unit having a hub section secured to said outer member and an axially extended rim section concentrically spaced about said lower discharge end of the chute member, and
  c. said connecting means including a peripheral pulley section on said wheel unit operatively associated with a belt pulley on said drive shaft.

5. The spreader assembly according to claim 2 wherein:
  a. the means for rotatably supporting said adjustable unit includes a bearing assembly within said chute member positioned about said outer member, and
  b. a plurality of radially extended arms on said bearing assembly connected to said chute member.

* * * * *